(12) United States Patent
Krueger

(10) Patent No.: US 7,594,637 B2
(45) Date of Patent: Sep. 29, 2009

(54) STEMWARE CLIP

(76) Inventor: Werner Krueger, 36 Leawood Drive, Grimsby, ON (CA) L3M 4E2

( * ) Notice: Subject to any disclaimer, the term of this patent is extended or adjusted under 35 U.S.C. 154(b) by 249 days.

(21) Appl. No.: 11/640,294

(22) Filed: Dec. 18, 2006

(65) Prior Publication Data

US 2007/0125729 A1 Jun. 7, 2007

Related U.S. Application Data

(63) Continuation of application No. PCT/CA2005/001125, filed on Jul. 18, 2005.

(60) Provisional application No. 60/598,642, filed on Aug. 4, 2004.

(51) Int. Cl.
*A01K 97/10* (2006.01)

(52) U.S. Cl. ............... 248/539; 248/113; 248/312; 248/313

(58) Field of Classification Search ............... D7/708.1, D7/620; 220/23.2, 23.4, 751; 248/539, 74.2, 248/113, 312, 313, 316.3, 316.7; 211/74, 211/85.25, 85.26, 120
See application file for complete search history.

(56) References Cited

U.S. PATENT DOCUMENTS

| 3,003,736 | A | * | 10/1961 | Hofgesand | 248/229.26 |
| 3,950,874 | A | * | 4/1976 | Diggs | 40/607.12 |
| 4,225,103 | A | * | 9/1980 | Pate | 248/74.3 |
| 4,541,602 | A | * | 9/1985 | Potzas | 248/544 |
| 4,655,424 | A | * | 4/1987 | Oshida | 248/73 |
| 6,394,285 | B1 | * | 5/2002 | Arthurs et al. | 211/41.9 |
| 7,086,630 | B2 | * | 8/2006 | Maruyama | 248/71 |
| 2008/0185352 | A1 | * | 8/2008 | O'Hara | 211/13.1 |

* cited by examiner

*Primary Examiner*—J. Allen Shriver, II
*Assistant Examiner*—Bradley H Duckworth

(57) ABSTRACT

A holder is disclosed which provides for the storage of a piece of stemware, in a boat, trailer or recreational vehicle, in a manner which permits convenient access to such stemware, and at the same time, safeguards against damage when the boat trailer or recreational vehicle is in transit. The holder comprises a mounting bracket and a clip. The clip is connected to the mounting bracket and is adapted to releasably receive the piece of stemware. The clip includes opposed first and second gripping fingers which, when the clip is in the releasable receipt of the piece, grip there between the stem of the piece to stably hold the piece at a storage position. The clip can also be formed integrally with the boat, trailer or recreational vehicle.

19 Claims, 11 Drawing Sheets

US 7,594,637 B2

STEMWARE CLIP

This is a continuation of the International Application CT/CA2005/001125 filed on Jul. 18, 2005 by Werner Krueger titled STEMWARE CLIP which designated the United States as a National Country. The PCT Application claims priority from previously filed U.S. Provisional 60/598,642, filed Aug. 4, 2004.

FIELD OF THE INVENTION

The present invention relates to the field of fixtures for mobile dwellings, such as boats, trailers and recreational vehicles, and more particularly, to a holder for stemware useful therewith.

BACKGROUND OF THE INVENTION

Persons wishing to have stemware available in a boat, trailer or recreational vehicle often resort to carefully wrapping such stemware in packing paper or the like and stowing same away when not in use, to avoid damage when the boat, trailer or recreational vehicle is in transit. This can be inconvenient.

SUMMARY OF THE INVENTION

The present invention, a holder, provides for the storage of a piece of stemware in a boat, trailer or recreational vehicle in a manner which permits convenient access to such stemware, and at the same time, safeguards same as against damage when said boat, trailer or recreational vehicle is in transit. The holder comprises a mounting bracket and a clip. The clip is connected to the mounting bracket and is adapted to releasably receive said piece of stemware, the clip including opposed first and second gripping fingers which, when the clip is in said releasable receipt of said piece, grip there between the stem of said piece to stably hold said piece at a storage position. The clip can also be formed integrally with the boat, trailer or recreational vehicle. Other advantages, features and characteristics of the invention, as well as methods of operation and functions of the related elements of the structure, and the combination of parts and economies of manufacture, will become apparent upon consideration of the following detailed description and the appended claims with reference to the accompanying images, the latter of which being described hereinafter.

BRIEF DESCRIPTION OF THE IMAGES

DETAILED DESCRIPTION OF THE PREFERRED EMBODIMENT

Figure 1:
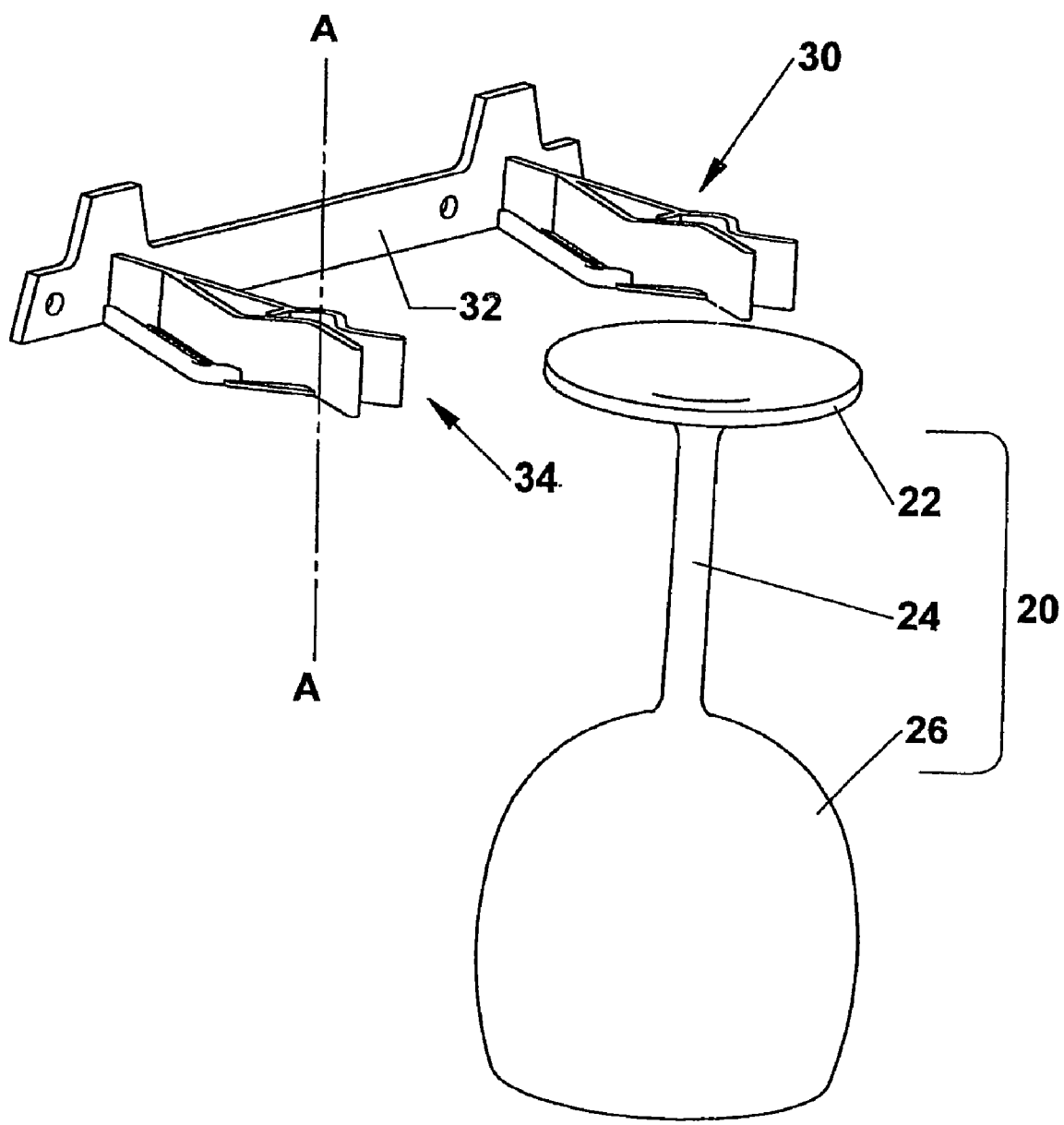
FIG. 1 is a front, top perspective view of a piece of stemware and, for use therewith, a holder according to a preferred embodiment of the present invention.
Figure 2:
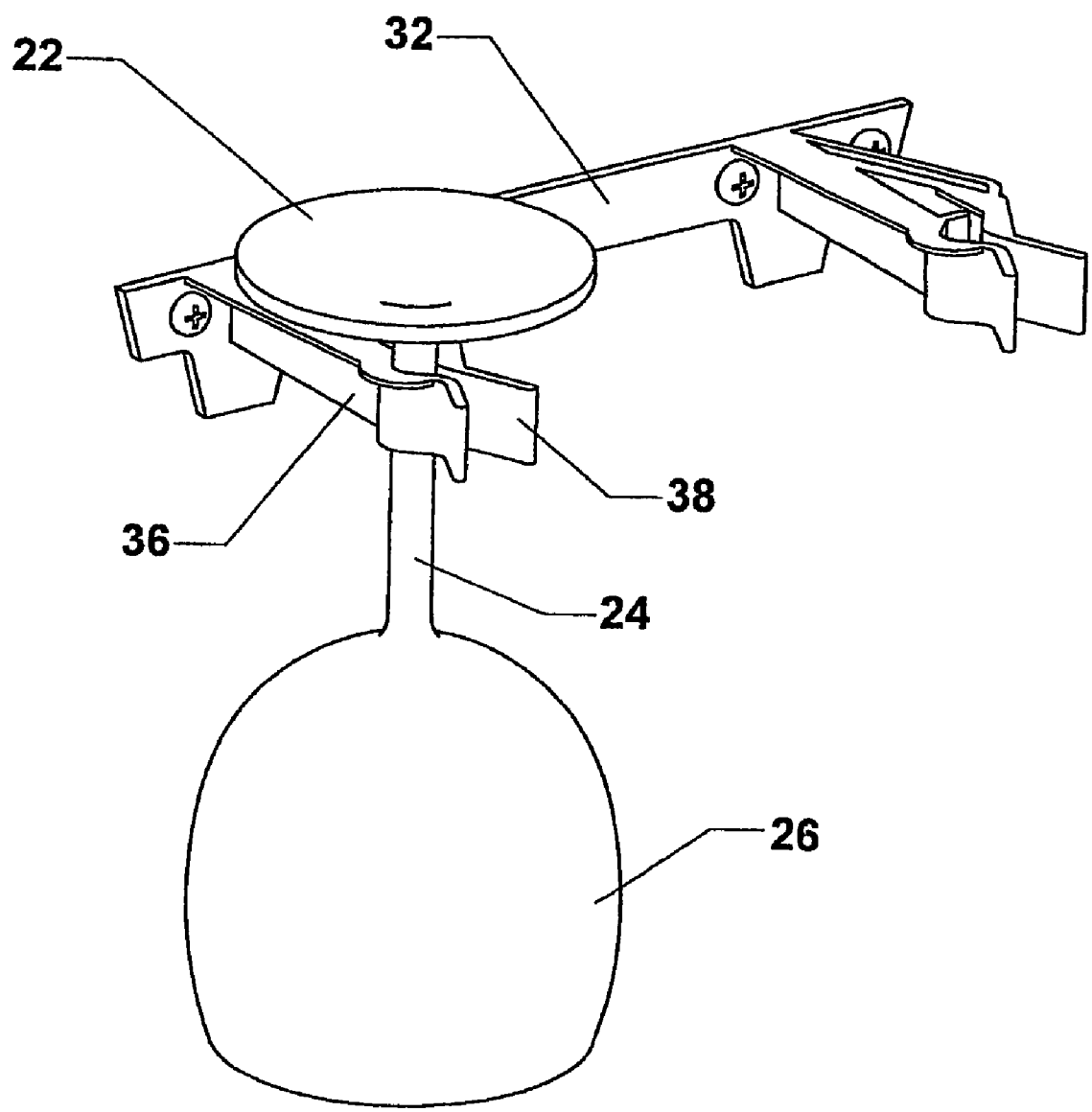
FIG. 2 is a front, top perspective view of the holder of FIG. 1 in use with the piece of stemware of FIG. 1.
Figure 3:
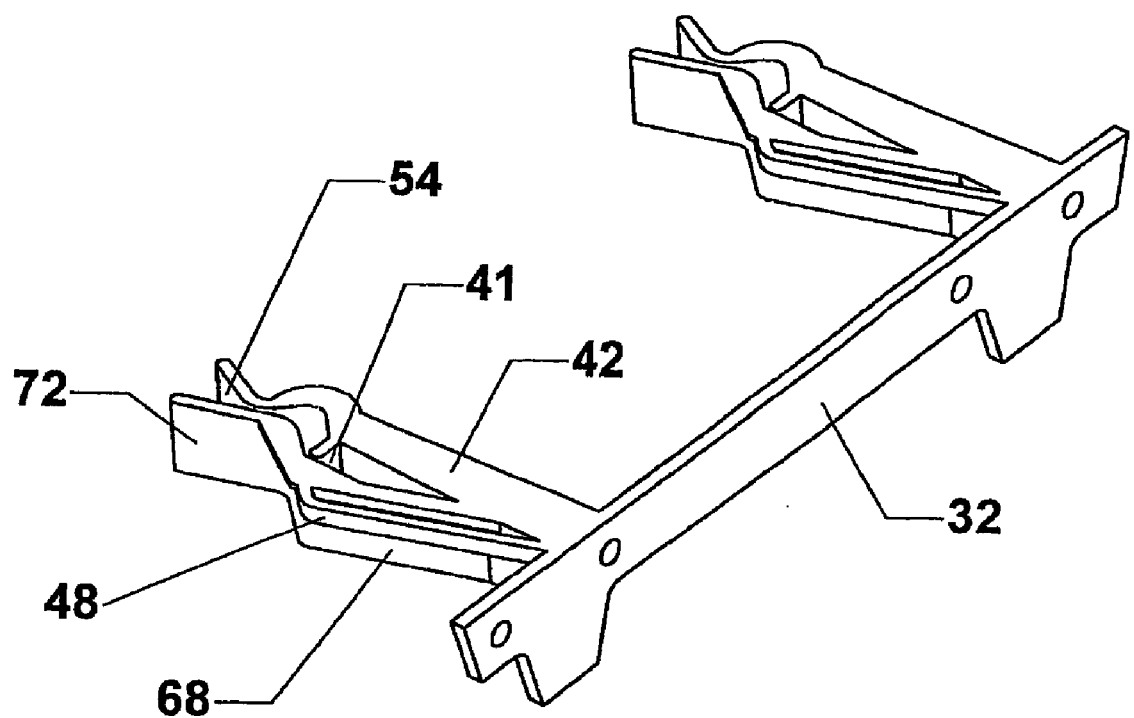
FIG. 3 is a rear, top perspective view of the holder of FIG. 3.
Figure 4:
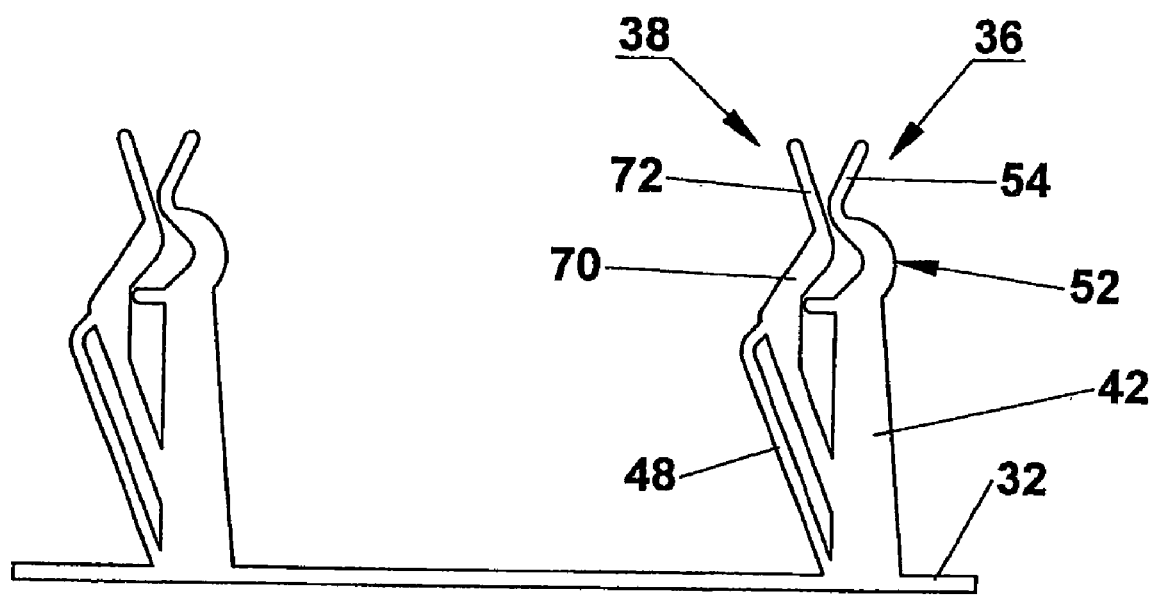
FIG. 4 is a top plan view of the holder of FIG. 3.

With general reference to FIG. 1, a piece of stemware 20 is shown, as is a holder according to a preferred embodiment of the present invention, the holder being designated with general reference numeral 30.

The piece of stemware 20 includes a base 22, a stem 24 extending from the base 22 and a bowl 26 mounted on the stem 24.

The holder 30 comprises a mounting bracket 32 and a clip 34. Actually two clips are provided in the holder 30 shown.

The mounting bracket 32 takes the form of a planar mounting plate which can be laid flush against and secured to a planar surface by screws, adhesive or the like (not shown).

Figure 5:
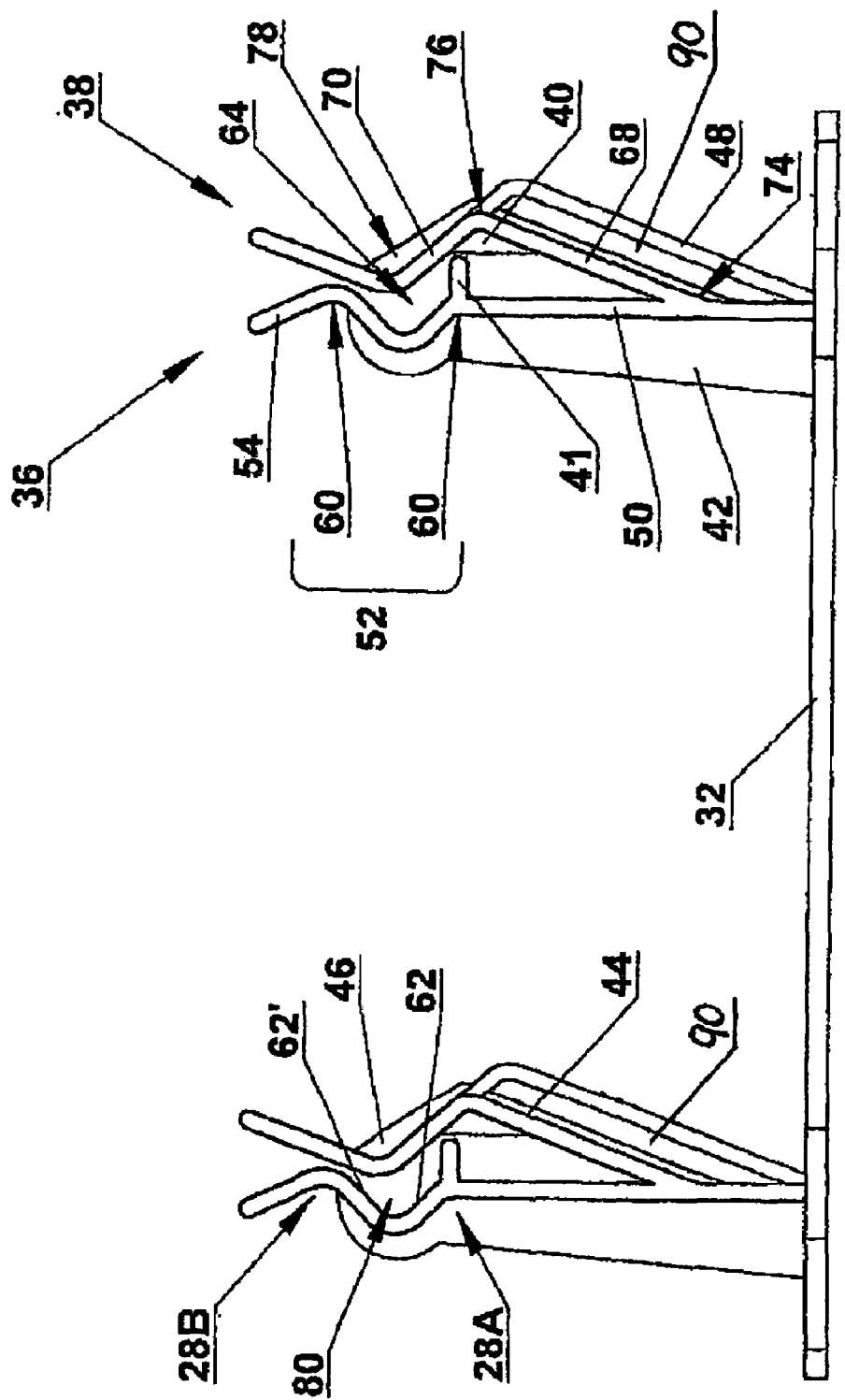
FIG. 5 is a bottom plan view of the holder of FIG. 3.
Figure 6:
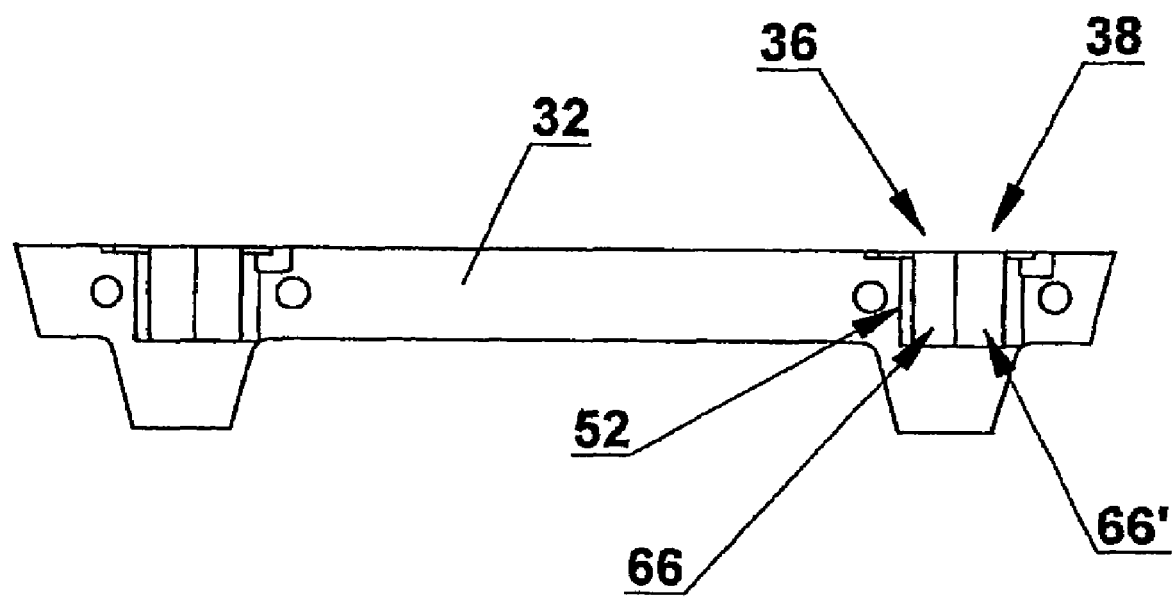
FIG. 6 is a front elevational view of the holder of FIG. 3.
Figure 7:
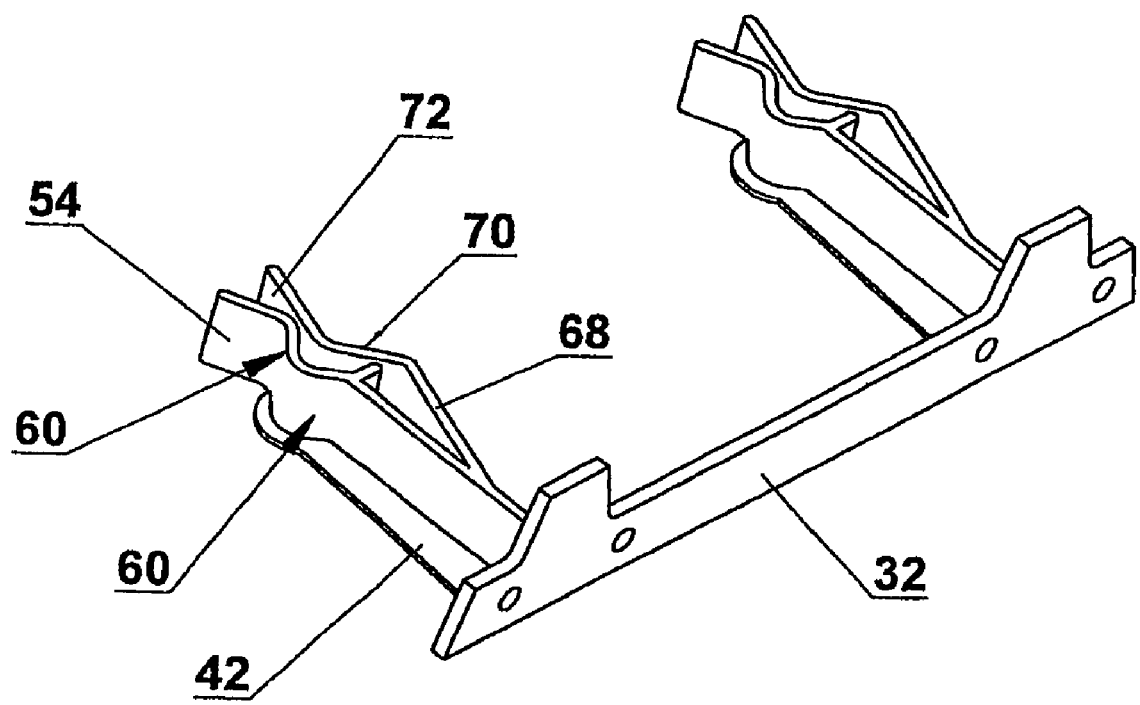
FIG. 7 is a bottom, rear perspective view of the holder of FIG. 3.
Figure 8:
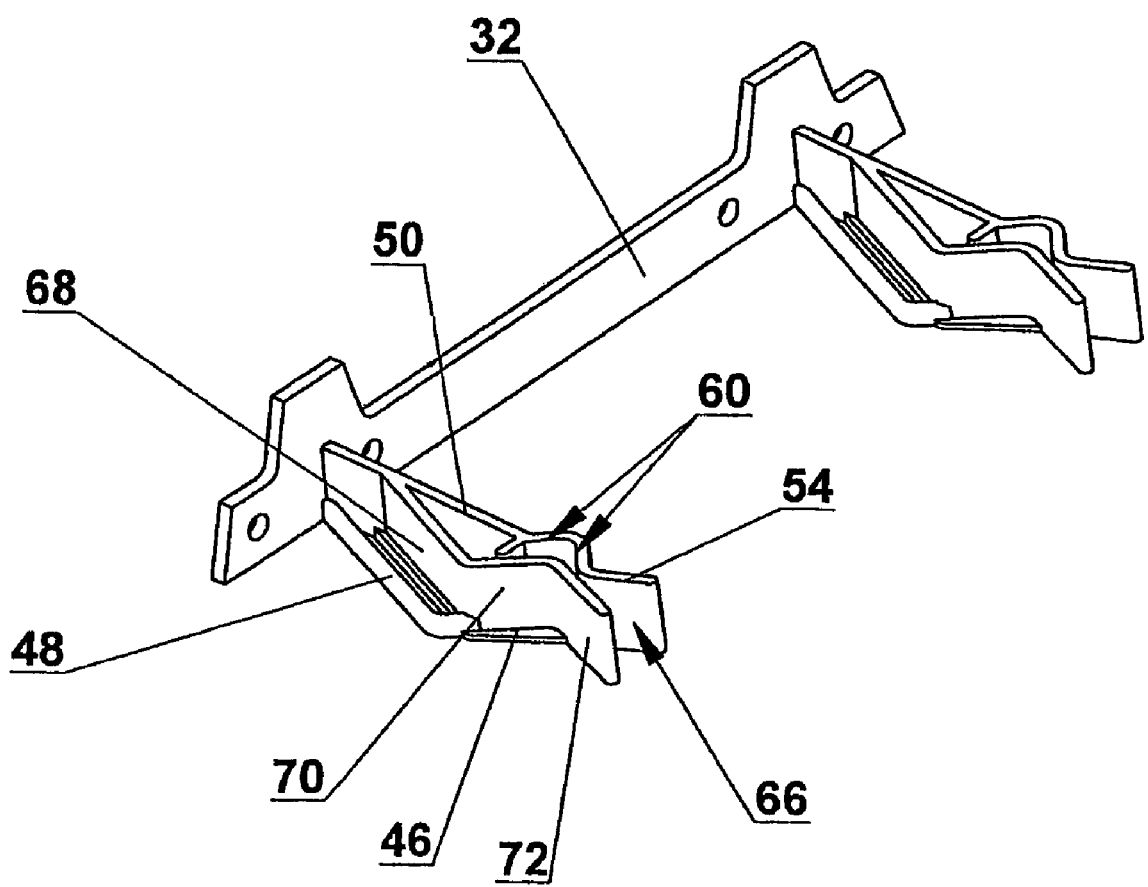
FIG. 8 is a bottom, front perspective view of the holder of FIG. 3.

The clip 34 defines a clip axis A-A and, as best seen in FIG. 5, includes opposed first 36 and second 38 gripping fingers, a gusset 40, an abutment member 41, a first reinforcing flange 42, a second reinforcing flange 44, a third reinforcing flange 46 and a reinforcing member 48.

The first gripping finger 36 has a base portion 50, a socket portion 52 and an end portion 54.

The base portion 50 is substantially planar and parallel to the clip axis, has a fixed end 56 operatively secured to the mounting bracket 32 and extends therefrom, in a direction substantially normal to the clip axis A-A, to a terminus 58.

The socket portion 52 includes a pair of substantially planar socket parts 60,60, each defining a respective stem-engaging surface 62,62'. The socket parts 60,60 are joined to one another to form an angle 60,60, the angle 60,60 being joined at one end 28A to the terminus 58 of the base portion 50 of the first gripping finger 36 so as to define a substantially V-shaped channel 64 opening in a direction substantially normal to the plane of said base portion 50 and aligned substantially parallel with the clip axis A-A.

The end portion 54 is substantially planar and parallel with the clip axis A-A, defines a ramp surface 66 of the first gripping finger 36 and extends from the other end 28B of said angle 60, 60.

The second gripping finger 38 has a base portion 68, an intermediate portion 70 and an end portion 72.

The base portion 68 is substantially planar and substantially parallel to the clip axis A-A, has a fixed end 74 operatively secured to the mounting bracket 32 and extends therefrom to a terminus 76 disposed to the side of the first gripping finger 36 defined by the direction of the channel 74 opening, and extends in acute angular relation to the base portion 50 of the first gripping finger 36.

Intermediate portion 70 is substantially planar, extends, from the terminus 76 of the base portion 68 of the second gripping finger 38, towards the first gripping finger 36, to a respective end 78, and is substantially parallel with the clip axis A-A.

The end portion 72 is substantially planar and substantially parallel with the clip axis A-A, defines a ramp surface 66' and extends from the end 78 of said intermediate portion 70. The junction of the end portion 72 and the intermediate portion 70 defines a grip portion 80.

The gusset 40 is disposed so as to strengthen one corner of the junction of the base portion 68 and the intermediate portion 70 of the second gripping finger 38.

The abutment member 41 is substantially planar, is substantially normal to the base portion 50 of the first gripping finger 36, and extends, from the junction of the base portion 50 and the angle 60, 60 of the first gripping finger 36, towards the junction of the gusset 40 and the intermediate portion 70 of the second gripping finger 38.

The first reinforcing flange 42 is generally sickle-shaped, extends along the base portion 50 of the first gripping finger, tapering in width as it so extends, and curves around the angle 60, 60, the first reinforcing flange 42 being generally planar, substantially coplanar with the gusset 40 and projecting away from the second gripping finger 38.

The second reinforcing flange 44 extends lengthwise along the base portion 68 of the second gripping finger 38, is generally planar, and projects away from the first gripping finger 36.

The third reinforcing flange 46 extends along the intermediate portion 70 of the second gripping finger 38 and merges into the second reinforcing flange 44, is substantially coplanar with the gusset 40 and with the first reinforcing flange 42 and projects away from the first gripping finger 36.

The reinforcing member 48 extends, from the mounting bracket 32, substantially parallel and in spaced relation to the base portion 68 of the second gripping finger 38 wherein the gap defined between the reinforcing member 48 and the base portion 68 is a slot 90.

Figure 9:
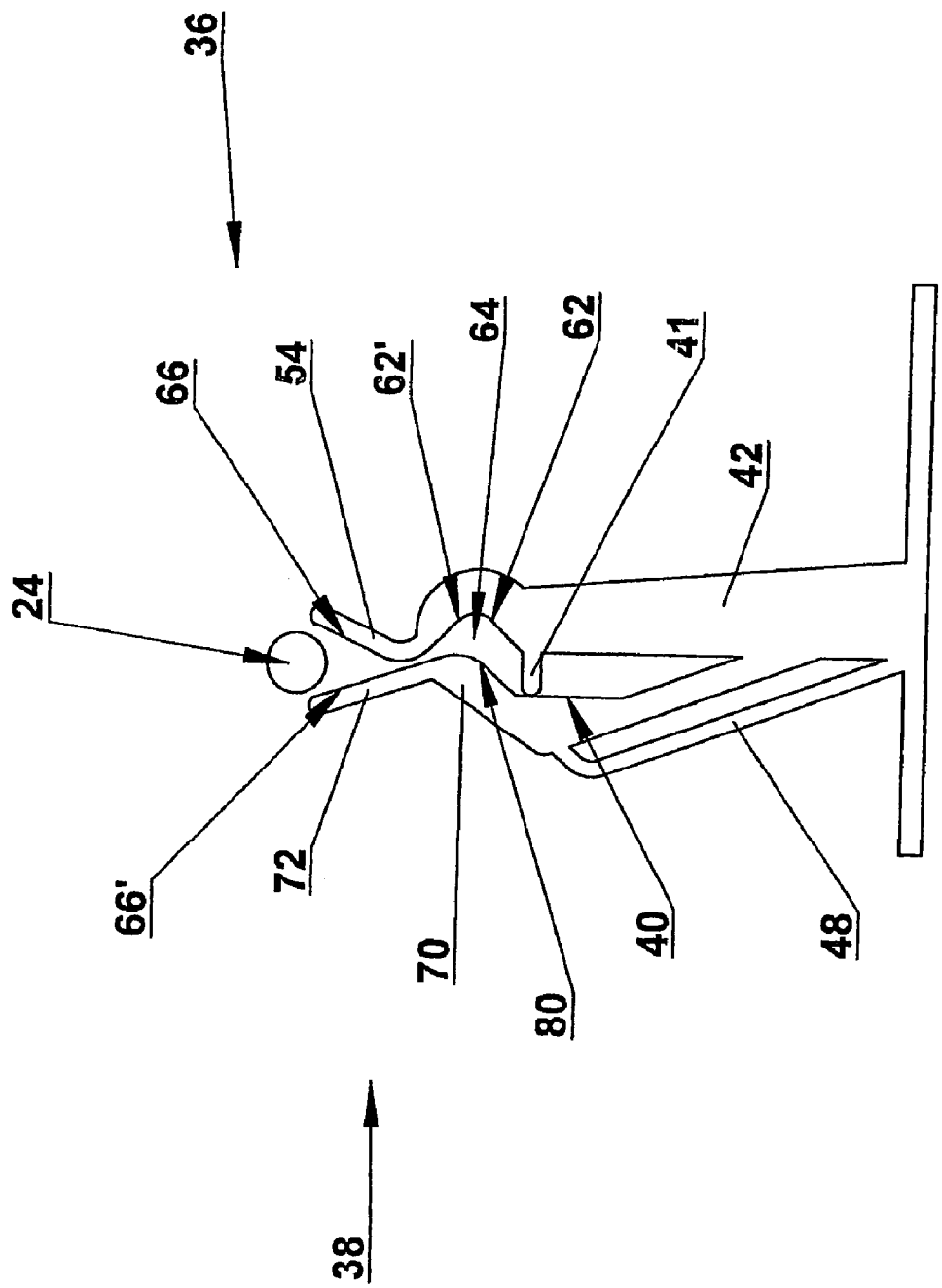
FIG. 9 is a top plan view of a portion of the holder of FIG. 4, wherein the gripping fingers are shown in a resting configuration and a stem is shown in cross section.
Figure 10:
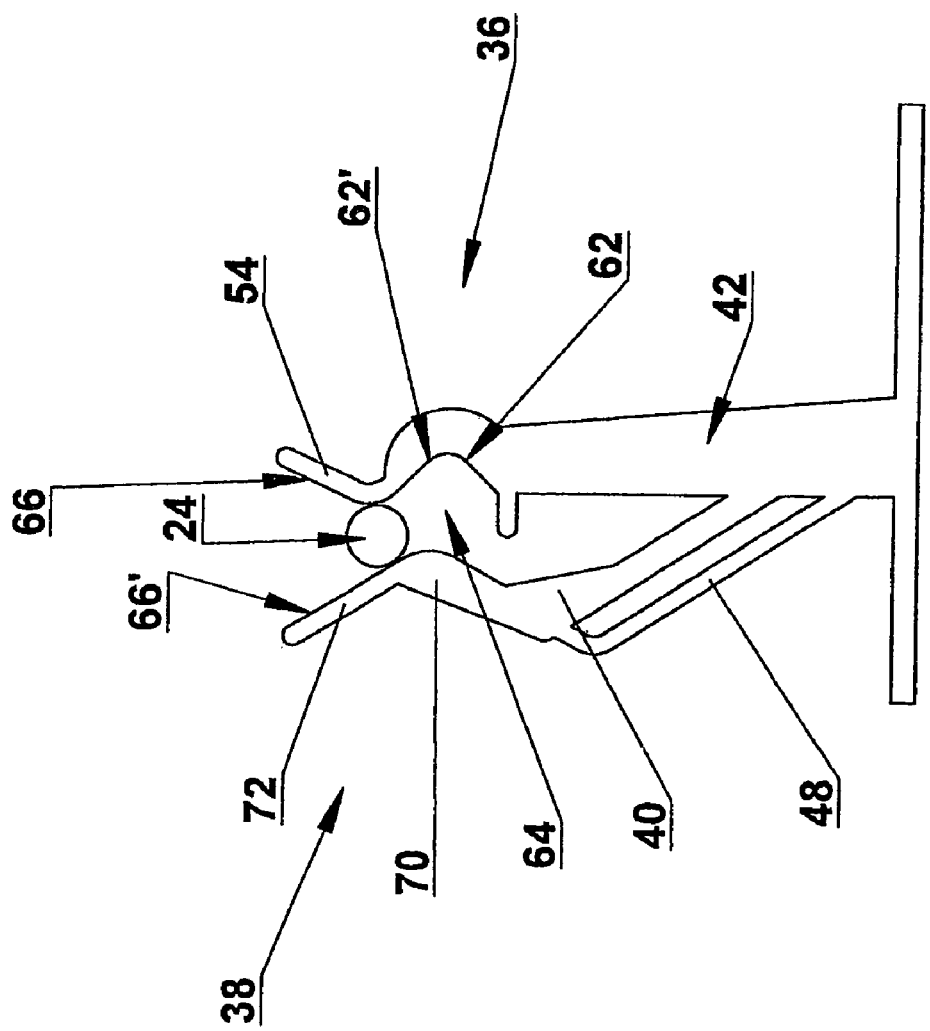
FIG. 10 is a view similar to FIG. 9, wherein the stem is shown at an intermediate location and the gripping fingers are shown in an extended configuration.

The gripping fingers 36,38 have a resting configuration, shown in FIG. 9, wherein they are disposed relatively proximal, to one another, and are adapted such that the stem 24 of said piece of stemware 20 can be forced there between to an intermediate position, shown in FIG. 10. As illustrated by the sequence of FIGS. 9,10, this action, which defines an initial reception step, urges the gripping fingers 36,38 from their resting configuration to an extended configuration, wherein the gripping fingers 36,38 are disposed relatively distal to one another. It should be understood that, in the initial reception step, the stem 24 travels along the ramp surfaces 66,66' of each of the first 36 and second 38 gripping fingers. That is, the ramp surfaces 66,66' provide a path for ingress and egress of the stem 24 to and from the intermediate position.

Figure 11:
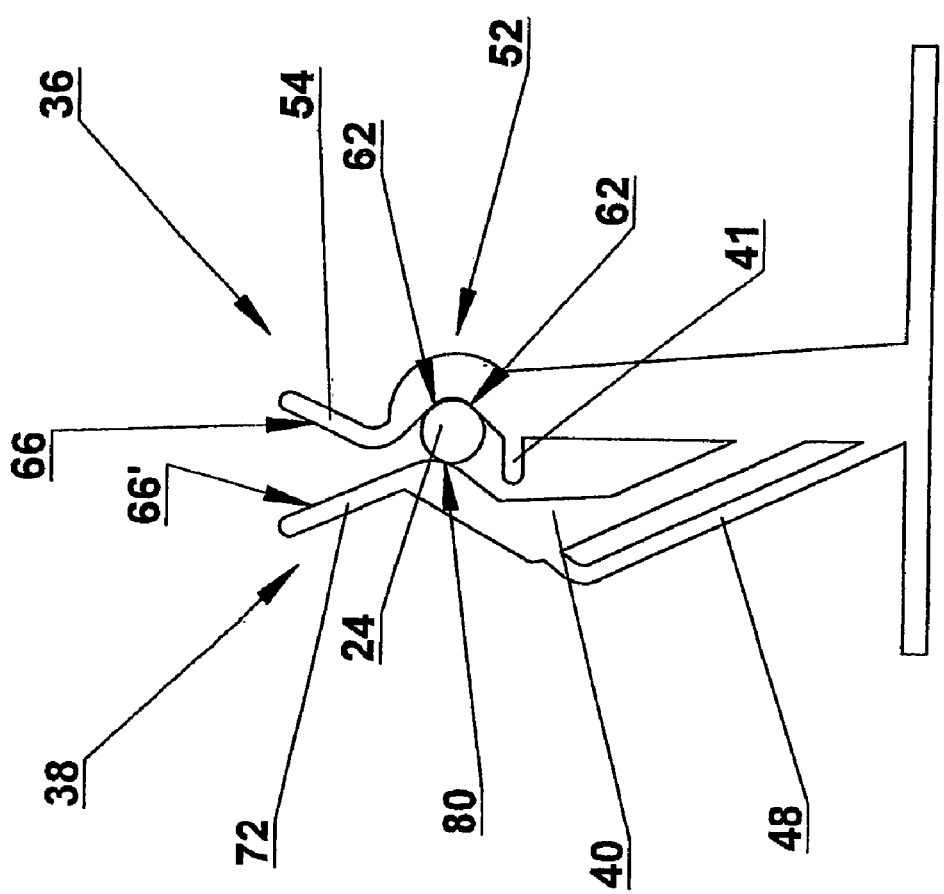
FIG. 11 is a view similar to FIG. 10, with the stem shown at an end position and the gripping fingers shown in a gripping configuration.

The gripping fingers 36,38 also have a gripping configuration, shown in FIG. 11, intermediate the resting and extended configurations, are adapted to permit movement of said stem 24 beyond the intermediate position to an end position, shown in FIG. 11, and are biased such that, at positions between the intermediate position (FIG. 10) and the end position (FIG. 11), the gripping fingers 36,38 bear against the stem 24 to drive said stem 24 to the end position, such action defining a final reception step. Again, for clarity, it should be understood that the stem 24 travels along the ramp surface 66' of the second gripping finger 38 and along one of the stem-engaging surfaces 62' of the socket portion 52 in the final reception step. That is, the ramp surface 68' of the second gripping finger 38 and said one of the stem-engaging surfaces 62' provide a path for the stem 24 between the intermediate position and the end position, more particularly, a path for ingress and egress of the stem 24 into and out of the channel 64. At the end position of the stem 24, the socket portion 52 wraps around one side of the stem 24, with the stem-engaging surfaces 62,62' engaging adjacent quadrants of said one side of the stem 24, and the grip portion 80 bears against the stem 24 in opposed relation to the socket portion 52, such that the gripping fingers 36,38 releasably grip there between the stem 24 of said piece 20 to stably hold said piece 20 at a storage position wherein the stem 24 is aligned coincident with the clip axis A-A and the piece of stemware 20 is releasably received by the clip 30.

From the foregoing, it will be understood that the holder 30 provides for the storage of a piece 20 of stemware in a boat, trailer or recreational vehicle (not shown); a user need merely secure the mounting bracket 32 of the holder 30 to an appropriate surface (not shown) and force the stem 24 of a piece 22 of stemware between the gripping fingers 36,38 to a location beyond the intermediate position, whereupon bias provided by the gripping fingers 36,38 urges the stem 24 to an end position, where at the piece 20 of stemware is stably held at the storage position. At the same time, the holder 30 provides convenient access to such piece 20 of stemware; the user need merely withdraw the stem 24 from the gripping fingers 36,38 beyond the intermediate location, whereupon the gripping fingers 36,38 will spring back to the resting configuration, ejecting the piece 20 of stemware in the process, for use (and for subsequent restorage as desired).

Whereas a specific piece of stemware is shown and described, it will be evident that the holder 30 illustrated has use with stemware of widely ranging dimensions. As such, it should be understood that the intermediate location of the stem, and the geometry of the gripping and extended configurations of any given holder constructed according to the invention will vary with the dimensions of the stemware with which such holder is used. Moreover, while but a single embodiment of the present invention is herein shown and described, it will be understood that various changes in size and shape of parts may be made. For example, only, the clip may be lengthened or shortened, to accommodate pieces of stemware having bowls of greater or lesser diameter. Multiple clips can also be employed on a common bracket. As well, whereas the clip is described herein as part of a holder, for sale as an aftermarket product, it should be understood that the clip could be manufactured in a boat, trailer or recreational vehicle. Accordingly, the scope of the invention is not intended to be limited by the description, but rather, is intended only to be limited by the claims appended hereto, when purposively construed.

The invention claimed is:

1. A holder for a piece of stemware comprising:
   a) a mounting bracket; and
      a clip connected to the mounting bracket and adapted to releasably receive said piece, the clip including opposed first and second gripping fingers which, when the clip is in said releasable receipt of said piece, gripping there between the stem of said piece to stably hold said piece at a storage position;
   b) wherein the clip is characterized in that the first gripping finger has a base portion and a socket portion wrapping around one side of the stem when said piece is received by the clip,
   c) wherein the second gripping finger including a grip portion which bears against the stem in opposed relation to the socket portion when said piece is received by the clip;
   d) wherein the second gripping finger including a base portion extending in acute angular relation to the first finger base portion, the second gripping finger base portion extending from a fixed end connected to the mounting bracket to a terminus;
   e) wherein the second gripping finger further including a reinforcing member extending parallel to and spaced from the second gripping finger base portion thereby defining a slot between the second gripping finger base portion and the reinforcing member wherein the reinforcing member attached at each distal end to the second gripping finger base portion.

2. A holder according to claim 1, wherein the gripping fingers are elastically deformable from a resting configuration, wherein the gripping fingers are disposed relatively proximal to one another, to an extended configuration, wherein the gripping fingers are disposed relatively distal to one another, the gripping fingers further having a gripping configuration, intermediate the resting and extended configurations.

3. A holder according to claim 2, wherein the gripping fingers are adapted such that the stem of said piece of stemware can be forced there between to an intermediate position to urge the gripping fingers from their resting configuration to their extended configuration, such action defining an initial reception step.

4. A holder according to claim 3, wherein the gripping fingers are adapted to permit movement of said stem between the intermediate position and an end position which defines the storage position of the piece of stemware, and wherein, at positions of said stem between the intermediate position and the end position, the gripping fingers are biased to bear against the stem to drive said stem to the end position, such action defining a final reception step.

5. A holder according to claim 1, wherein the first and second gripping fingers each have a respective ramp surface along which the stem travels in the initial reception step.

6. A holder according to claim 5, wherein the stem travels along the ramp surface of the second gripping finger and along one of the stem-engaging surfaces of the socket portion in the final reception step.

7. A holder according to claim 6, wherein the clip defines a clip axis which is aligned coincident with the axis of the stem when said piece is at its storage position, and wherein the first gripping finger has a substantially planar base portion, the base portion being substantially parallel to the clip axis, having a fixed end operatively secured to the mounting bracket and extending there from, in a direction substantially normal to the clip axis, to a terminus.

8. A holder according to claim 7, wherein the socket portion includes a pair of substantially planar socket parts joined to one another to form an angle, the angle being joined at one end to the terminus of the base portion of the first gripping finger so as to define a substantially V-shaped channel opening in a direction substantially normal to the plane of said base portion and being aligned substantially parallel with the clip axis, each socket part defining a respective one of the stem-engaging surfaces.

9. A holder according to claim 8, wherein the first gripping finger further has a substantially planar end portion, said end portion being substantially parallel with the clip axis, defining the ramp surface of the first gripping finger and extending from the other end of said angle such that said ramp surface provides a path for ingress and egress of the stem into and out of the channel.

10. A holder according to claim 9, wherein the second gripping finger has a substantially planar base portion substantially parallel to the clip axis, the base portion having a fixed end operatively secured to the mounting bracket and extending there from to a terminus disposed to the side of the first gripping finger defined by the direction of the channel opening, the base portion of the second gripping finger lying in acute angular relation to the base portion of the first gripping finger.

11. A holder according to claim 10, wherein the second gripping finger further includes a substantially planar intermediate portion, said intermediate portion extending from the terminus of the base portion of the second gripping finger, towards the first gripping finger, to a respective end, and being substantially parallel with the clip axis.

12. A holder according to claim 11, wherein the second gripping finger has a substantially planar end portion substantially parallel with the clip axis, the end portion defining the ramp surface of the second gripping finger and extending from the end of the intermediate portion to provide a path for ingress and egress of the stem into and out of the channel, the junction of the end portion and the intermediate portion defining the grip portion.

13. A holder according to claim 12, further comprising a gusset disposed so as to strengthen one corner of the junction of the base portion and the intermediate portion of the second gripping finger.

14. A holder according to claim 13, further comprising a substantially planar abutment member which is substantially normal to the base portion of the first gripping finger, and extends, from the junction of the base portion and the angle of the first gripping finger, towards the junction of the gusset and the intermediate portion of the second gripping finger.

15. A holder according to claim 13, further comprising a generally sickle-shaped first reinforcing flange which extends along the base portion of the first gripping finger, tapering in width as it so extends, and curves around the angle, the first reinforcing flange being generally planar, oriented substantially coplanar with the gusset and projecting away from the second gripping finger.

16. A holder according to claim 14, further comprising a second reinforcing flange which extends along the length of the base portion of the second gripping finger, the second reinforcing flange being generally planar and projecting away from the first gripping finger.

17. A holder according to claim 16, wherein the clip further includes a third reinforcing flange which extends along the intermediate portion of the second gripping finger and merges into the second reinforcing flange, the third reinforcing flange being substantially coplanar with the gusset and with the first reinforcing flange and projecting away from the first gripping finger.

18. A holder according to claim 16, wherein the clip further includes a reinforcing member which extends, from the mounting bracket, substantially parallel and in spaced relation to the base portion of the second gripping finger, and thereafter extends, substantially parallel to the intermediate portion of the second gripping finger, to the junction of the base portion and the intermediate portion of the second gripping finger.

19. A holder for a piece of stemware claimed in claim 1 wherein the reinforcing member attached at the fixed end to the base portion and at the other end to the terminus of the base portion.

* * * * *